W. E. LONG.
CUTTER FOR RICE FIELDS.
APPLICATION FILED SEPT. 2, 1911.
1,042,243.
Patented Oct. 22, 1912.
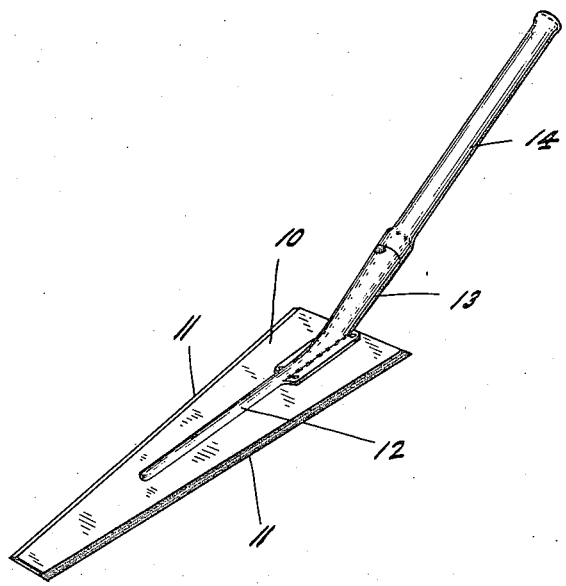
Witnesses
Frank A. Fahle
S. J. Carter
Inventor
William E. Long,
By Arthur M. Hood
Attorney

UNITED STATES PATENT OFFICE.

WILLIAM E. LONG, OF LAKE PROVIDENCE, LOUISIANA, ASSIGNOR TO E. C. ATKINS & COMPANY, OF INDIANAPOLIS, INDIANA, A CORPORATION OF INDIANA.

CUTTER FOR RICE-FIELDS.

1,042,243.

Specification of Letters Patent. Patented Oct. 22, 1912.

Application filed September 2, 1911. Serial No. 647,326.

*To all whom it may concern:*

Be it known that I, WILLIAM E. LONG, a citizen of the United States, residing at Lake Providence, in the parish of East Carroll and State of Louisiana, have invented a new and useful Cutter for Rice-Fields, of which the following is a specification.

In the raising of rice, the crop is allowed to grow to the height of from four to ten inches and is then flooded. At that time there is apt to be a considerable growth of weeds which, if topped at about the surface of the water, will die and it has heretofore been customary to run mowing machines into the field before flooding so as to cut the weeds at about the height mentioned. In such an operation, however, very considerable damage is done to the rice crop because of the weight of the machine and the consequent burying of the rice by the team and machine.

The object of my present invention is, therefore, to produce a tool which may be readily and efficiently used for cutting the weeds after the field has been flooded to approximately the depth desired.

The accompanying drawing, which is a perspective view, illustrates my improved tool.

The tool consists of a fairly long and comparatively wide, flat blade 10, which is conveniently made of a good grade of soft steel and preferably has its two side edges convergent away from the handle end, said edges being sharpened as clearly indicated at 11. Secured along the middle of the top face of blade 10 is a reinforcing finger 12 which serves to stiffen the blade, and this finger is conveniently a portion of a fitting having an upwardly and rearwardly inclined handle socket 13 adapted to receive a handle 14 of any desired length and shape.

In operation, the operator, after a rice field has been flooded, goes into the field with the tool described and, by letting a major portion of its weight rest upon the water, "floats" it upon the water and swings it from side to side, cutting the projecting tops of everything at the surface of the water and very easily cutting a swath about ten feet wide, the weeds and tops of the rice stalks being very tender. The topping of the rice at this period in its growth, before the stalk flattens preparing to "boot," benefits the rice and the topped weeds die as soon as the water is increased a little in depth.

The angle of handle 14 relative to the blade is such as to make a convenient hold for the operator with the blade substantially horizontal so that it readily "floats" upon the surface of the water.

I claim as my invention:

1. A rice field tool comprising a comparatively thin broad blade long in comparison to its breadth and having its long edges sharpened and slightly convergent, and a handle projecting obliquely upwardly from the butt end thereof.

2. A rice field tool comprising a comparatively thin broad blade having its long edges sharpened, and a handle projecting obliquely upwardly from the butt end thereof.

In witness whereof, I have hereunto set my hand and seal at Lake Providence, this 30th day of August, A. D. one thousand nine hundred and eleven.

W. E. LONG. [L. S.]

Witnesses:
H. F. SEMPLE,
W. McF. LONG.